United States Patent
Imbrogno et al.

(10) Patent No.: US 10,269,167 B1
(45) Date of Patent: Apr. 23, 2019

(54) INDIRECT COMMAND BUFFERS FOR GRAPHICS PROCESSING

(71) Applicant: Apple Inc., Cupertino, CA (US)

(72) Inventors: Michael Imbrogno, San Jose, CA (US); Michal Valient, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/984,931

(22) Filed: May 21, 2018

(51) Int. Cl.
G06F 9/54 (2006.01)
G06T 1/20 (2006.01)
G06T 1/60 (2006.01)
G06T 15/00 (2011.01)

(52) U.S. Cl.
CPC ............ *G06T 15/005* (2013.01); *G06F 9/544* (2013.01); *G06T 1/20* (2013.01); *G06T 1/60* (2013.01)

(58) Field of Classification Search
None
See application file for complete search history.

(56) References Cited

U.S. PATENT DOCUMENTS

| 7,950,003 | B1 * | 5/2011 | Duca | G06F 8/20 |
| | | | | 717/124 |
| 8,675,002 | B1 | 3/2014 | Andonieh | |
| 8,803,900 | B2 | 8/2014 | Truong | |
| 9,286,649 | B2 | 3/2016 | Balci | |
| 9,547,930 | B2 | 1/2017 | Seetharamaiah | |
| 2006/0132491 | A1 * | 6/2006 | Riach | G06T 15/005 |
| | | | | 345/505 |
| 2011/0050713 | A1 | 3/2011 | McCrary | |
| 2013/0016110 | A1 * | 1/2013 | Arvo | G06F 9/4881 |
| | | | | 345/522 |
| 2013/0141448 | A1 * | 6/2013 | Yokota | G06T 1/00 |
| | | | | 345/522 |
| 2014/0354660 | A1 * | 12/2014 | Balci | G06T 1/20 |
| | | | | 345/522 |
| 2015/0339171 | A1 | 11/2015 | Andonieh | |

(Continued)

OTHER PUBLICATIONS

"Indirect drawing and GPU culling," retrieved from the Internet: URL: https://msdn.microsoft.com/en-us/library/windows/desktop/mt604705(v=vs.85).aspx [retrieved on Mar. 8, 2018].

(Continued)

*Primary Examiner* — Joni Richer
(74) *Attorney, Agent, or Firm* — Blank Rome LLP

(57) ABSTRACT

Systems, methods, and computer readable media to encode and execute an indirect command buffer are described. A processor creates an indirect command buffer that is configured to be encoded into by a graphics processor at a later point in time. The processor encodes, within a command buffer, a produce command that references the indirect command buffer, where the produce command triggers execution on the graphics processor a first operation that encodes a set of commands within the data structure. The processor also encodes, within the command buffer, a consume command that triggers execution on the graphics processor a second operation that executes the set of commands encoded within the data structure. After encoding the command buffer, a processor commits the command buffer for execution on the graphics processor.

20 Claims, 9 Drawing Sheets

(56) References Cited

U.S. PATENT DOCUMENTS

| | | | | |
|---|---|---|---|---|
| 2016/0055608 A1* | 2/2016 | Frascati | .................... | G06T 1/20 345/522 |
| 2016/0358302 A1* | 12/2016 | Sowerby | .................... | G06T 1/20 |
| 2016/0358306 A1* | 12/2016 | Begeman | .............. | G06T 15/503 |
| 2018/0122129 A1* | 5/2018 | Peterson | .............. | H04N 21/854 |

OTHER PUBLICATIONS

"Indirect Drawing," retrieved from the Internet: URL: https://msdn.microsoft.com/en-us/library/desktop/dn903925(v=vs.85).aspx [retrieved on Mar. 8, 2018].

* cited by examiner

INDIRECT COMMAND BUFFERS FOR GRAPHICS PROCESSING

BACKGROUND

This disclosure relates generally to the field of graphics processing. More particularly, but not by way of limitation, this disclosure relates to encoding and executing indirect command buffers on a graphics processor, such as a graphics processing unit (GPU).

Computers, mobile devices, and other computing systems typically have at least one programmable processor, such as a central processing unit (CPU) and other programmable processors specialized for performing certain processes or functions (e.g., graphics processing). Examples of a programmable processor specialized to perform graphics processing operations include, but are not limited to, a GPU, a digital signal processor (DSP), a field programmable gate array (FPGA), and/or a CPU emulating a GPU. GPUs, in particular, comprise multiple execution cores (also referred to as shader cores) designed to execute commands on parallel data streams, making them more effective than general-purpose processors for operations that process large blocks of data in parallel. For instance, a CPU functions as a host and hands-off specialized parallel tasks to the GPUs. Specifically, a CPU can execute an application stored in system memory that includes graphics data associated with a video frame. Rather than processing the graphics data, the CPU forwards the graphics data to the GPU for processing; thereby, freeing the CPU to perform other tasks concurrently with the GPU's processing of the graphics data.

To perform graphics processing, applications utilize graphics application program interfaces (APIs), such as OpenGL®, Direct3D®, or Metal®, to interface with a graphics processor, such as a GPU (OPENGL is a registered trademark of Silicon Graphics, Inc.; DIRECT3D is a registered trademark of Microsoft Corporation; and METAL is a registered trademark of Apple Inc.). To utilize certain GPU capabilities, applications and/or developers may allocate and pass a set of graphics API resources via one or more API calls to the GPU. Each API call could have sizeable overhead cost and/or latency associated with generating the API call. Additionally, where a particular set of API calls are used from frame to frame, passing the set of API calls repeatedly over multiple frames often is a relatively inefficient use of system resources and is time consuming. As such, having a graphics API that allows applications and/or designers to efficiently managing API calls may be beneficial in improving application performance.

SUMMARY

In one implementation, a method is described to create a data structure configured to be encoded into and executed by a graphics processor at a later point in time. The method encodes, within a command buffer, a first command that references the data structure, where the first command is to be executed by the graphics processor and causes the graphics processor to encode a set of commands within the data structure. The method also encodes, within the command buffer, a second command that is to be executed by the graphics processor, where execution of the second command causes execution of the set of commands encoded within the data structure. After encoding the command buffer, the method commits the command buffer that includes the first command and the second command for execution on the graphics processor, where the processor is unable to encode the command buffer after committing the command buffer for execution.

In another implementation, a system comprises memory and a processor operable to interact with the memory. The processor is able to create an indirect command buffer configured to be encoded into by a graphics processor at a later point in time and encode, within a command buffer, a produce command that references the indirect command buffer, where the produce command causes execution on the graphics processor a first operation that encodes a set of commands within the indirect command buffer. The processor also encodes, within the command buffer, a consume command that causes execution on the graphics processor a second operation that executes the set of commands encoded within the indirect command buffer. The processor then commits the command buffer that includes the produce command and the consume command for execution on the graphics processor. The indirect command buffer is not populated with any commands when the command buffer is committed for execution.

In another implementation, a method is described to obtain a command buffer that includes a produce command and a consume command that references a data structure. The data structure is not populated with any commands when the method obtains the command buffer. The method then executes the produce command that references the data structure to perform a first operation to encode a set of commands within the data structure and executes after encoding the set of commands, a consume command to perform a second operation to execute the set of commands encoded within the data structure.

In yet another implementation, a system comprises memory and a graphics processor operable to interact with the memory. The graphics processor is able to obtain a command buffer that includes a produce command and a consume command that references an indirect command buffer. The indirect command buffer is not populated with any commands when the processor obtains the command buffer. The processor then executes the produce command that references the data structure to perform a first operation to encode a set of commands within the data structure and executes after encoding the set of commands, a consume command to perform a second operation to execute the set of commands encoded within the data structure.

In one implementation, each of the above described methods, and variations thereof, may be implemented as a series of computer executable instructions executed on a programmable control device. Such instructions may use any one or more convenient programming language. Such instructions may be collected into engines and/or programs and stored in any media that is readable and executable by a computer system or other programmable control device.

BRIEF DESCRIPTION OF THE DRAWINGS

While certain implementations will be described in connection with the illustrative implementations shown herein, this disclosure is not limited to those implementations. On the contrary, all alternatives, modifications, and equivalents are included within the spirit and scope of the invention as defined by the claims. In the drawings, which are not to scale, the same reference numerals are used throughout the description and in the drawing figures for components and elements having the same structure, and primed reference numerals are used for components and elements having a FIG. 1 is a diagram of a graphics processing path where implementations of the present disclosure may operate.

DETAILED DESCRIPTION

Figure 1:
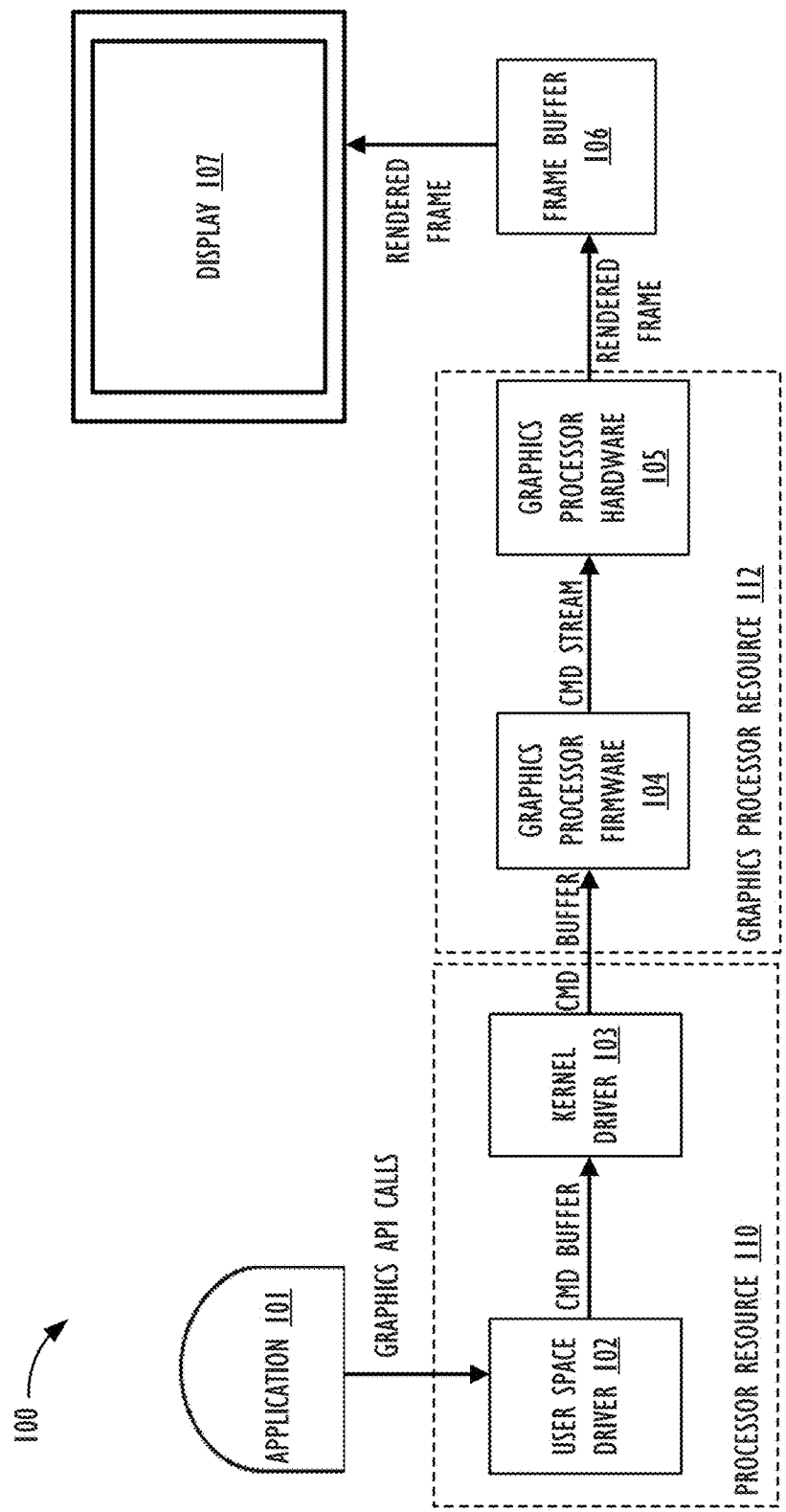

This disclosure includes various example implementations that encode and execute indirect command buffers using a graphics processor. In one implementation, a graphics API allows a developer and/or application to delay encoding a set of commands by creating an indirect command buffer. The graphics API allows a CPU to build a command buffer that includes a produce command that references the indirect command buffer. The graphics API also allows a CPU to encode within the command buffer a consume command to execute commands that eventually populate within the indirect command buffer. After the CPU presents and commits the command buffer to the GPU for execution, a graphics scheduler (e.g., GPU driver and/or GPU firmware) schedules the commands within the committed command buffer for the GPU to execute. When the GPU receives the produce command from the graphics scheduler, the GPU populates the commands within the indirect command buffer. The GPU can also receive a command to optimize (e.g., memory compaction) the indirect command buffer after populating the commands and prior to executing the indirect command buffer. Once the GPU finishes encoding and optimizing the indirect command buffer, the GPU executes the commands within the indirect command buffer after receiving the consumption command from the graphics scheduler.

In the following description, for purposes of explanation, numerous specific details are set forth in order to provide a thorough understanding of the inventive concept. As part of this description, some of this disclosure's drawings represent structures and devices in block diagram form in order to avoid obscuring the disclosed principles. In the interest of clarity, not all features of an actual implementation are necessarily described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one implementation" or to "an implementation" means that a particular feature, structure, or characteristic described in connection with the implementation is included in at least one implementation, and multiple references to "one implementation" or "an implementation" should not be understood as necessarily all referring to the same implementation.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "kernel" in this disclosure refers to a computer program that is part of a core layer of an operating system (e.g., Mac OSX™) typically associated with relatively higher or the highest security level. The "kernel" is able to perform certain tasks, such as managing hardware interaction (e.g., the use of hardware drivers) and handling interrupts for the operating system. To prevent application programs or other processes within a user space from interfering with the "kernel," the code for the "kernel" is typically loaded into a separate and protected area of memory. Within this context, the term "kernel" may be interchangeable throughout this disclosure with the term "operating system kernel."

The disclosure also uses the term "compute kernel," which has a different meaning and should not be confused with the term "kernel" or "operating system kernel." In particular, the term "compute kernel" refers to a program for a graphics processor (e.g., GPU, DSP, or FPGA). In the context of graphics processing operations, programs for a graphics processor are classified as a "compute kernel" or a "shader." The term "compute kernel" refers to a program for a graphics processor that performs general compute operations (e.g., compute commands), and the term "shader" refers to a program for a graphics processor that performs graphics operations (e.g., render commands).

As used herein, the term "command" in this disclosure refers to a graphics API command encoded within a data structure, such as command buffer or command list. The term "command" can refer to a render command (e.g., for draw calls) and/or a compute command (e.g., for dispatch calls) that a graphics processor is able to execute. The terms "render command" and "compute command" are well-known terms of art understood by skilled artisans in the field of graphics processing.

For the purposes of this disclosure, the term "processor" refers to a programmable hardware device that is able to process data from one or more data sources, such as memory. One type of "processor" is a general-purpose processor (e.g., a CPU) that is not customized to perform specific operations (e.g., processes, calculations, functions, or tasks), and instead is built to perform general compute operations. Other types of "processors" are specialized processor customized to perform specific operations (e.g., processes, calculations, functions, or tasks). Non-limiting examples of specialized processors include GPUs, floating-point processing units (FPUs), DSPs, FPGAs, application-specific integrated circuits (ASICs), and embedded processors (e.g., universal serial bus (USB) controllers).

As used herein, the term "graphics processor" refers to a specialized processor for performing graphics processing operations. Examples of "graphics processors" include, but are not limited to, a GPU, DSPs, FPGAs, and/or a CPU emulating a GPU. In one or more implementations, graphics processors are also able to perform non-specialized operations that a general-purpose processor is able to perform. As previously presented, examples of these general compute operations are compute commands associated with compute kernels.

FIG. 1 is a diagram of a graphics processing path 100 where implementations of the present disclosure may operate. FIG. 1 illustrates that the graphics processing path 100 utilizes a processor resource 110 and a graphics processor resource 112. The processor resource 110 includes one or more general-purpose processors (e.g., CPUs), where each processor has one or more cores. The processor resource 110 can also contain and/or communicate with memory (e.g., cache memory), microcontrollers, and/or any other hardware resources a processor may utilize to process commands for graphics processor resource 112 to execute. The graphics processor resource 112 includes one or more graphics processors (e.g., GPUs), where each graphics processor has one or more execution cores and other computing logic for performing graphics and/or general compute operations. Stated another way, the graphics processor resource 112 may also encompass and/or communicate with memory (e.g., cache memory), and/or other hardware resources to execute programs, such as shaders or compute kernels. For example, graphics processor resource 112 is able to process shaders with a rendering pipeline and compute kernels with a compute pipeline.

FIG. 1 illustrates that application 101 generates graphics API calls for the purpose of encoding commands for the graphics processor resource 112 to execute. To generate the graphics API calls, application 101 includes code written with a graphics API. The graphics API (e.g., Metal®) represents a published and/or standardized graphics library and framework that define functions and/or other operations that application 101 is able to have with a graphics processor. For example, the graphics API allows application 101 to be able to control the organization, processing, and submission of render and compute commands, as well as the management of associated data and resources for those commands.

In one or more implementations, application 101 is a graphics application that invokes the graphics API to convey a description of a graphics scene. Specifically, the user space driver 102 receives graphics API calls from application 101 and maps the graphics API calls to operations understood and executable by the graphics processor resource 112. For example, the user space driver 102 can translate the API calls into commands encoded within command buffers before being transferred to kernel driver 103. The translation operation may involve the user space driver 102 compiling shaders and/or compute kernels into commands executable by the graphics processor resource 112. The command buffers are then sent to the kernel driver 103 to prepare the command buffers for execution on the graphics processor resource 112. As an example, the kernel driver 103 may perform memory allocation and scheduling of the command buffers to be sent to the graphics processor resource 112. For the purpose of this disclosure and to facilitate ease of description and explanation, unless otherwise specified, the user space driver 102 and the kernel driver 103 are collectively referred to as a graphics driver.

FIG. 1 illustrates that the graphics processor firmware 104, which can be executed on an embedded microcontroller within a graphics processor, obtains command buffers that processor resource 110 commits for execution. The graphics processor firmware 104 can perform a variety of operations to manage the graphics processor hardware 105 that includes powering up the graphics processor hardware 105 and/or scheduling the order of commands that the graphics processor hardware 105 receives for execution. After scheduling the commands, in FIG. 1, the graphics processor firmware 104 sends command streams to the graphics processor hardware 105. The graphics processor hardware 105 then executes the commands within the command streams according to the order the graphics processor hardware 105 receives the commands. The graphics processor hardware 105 includes numerous execution cores, and thus, can execute a number of received commands in parallel. The graphics processor hardware 105 then outputs rendered frames to frame buffer 106. In one implementation, the frame buffer 106 is a portion of memory, such as a memory buffer, that contains a bitmap that drives display 107. Display 107 subsequently access the frame buffer 106 and converts (e.g., using a display controller) the rendered frame (e.g., bitmap) to a video signal for display.

To populate and execute indirect command buffers, the graphics driver (e.g., the user space driver 102 and kernel driver 103) receive one or more graphics API calls that generate commands to produce and consume the indirect command buffers. A command that populates the indirect command buffer, which is also be referred to within this disclosure as a "produce command," references an indirect command buffer into which a graphics processor can later encode. When the graphics processor hardware 105 executes the produce command, the graphics processor hardware 105 starts to encode commands into the referenced indirect command buffer. Stated another way, the graphics processor hardware 105 populates commands into the referenced indirect command buffer based on the execution of the produce command. A command that executes the referenced indirect command buffers is referred to within this disclosure as a "consume command." When the graphics processor hardware 105 receives the consume command, the graphics processor hardware 105 executes the commands populated within the indirect command buffer. For the purpose of this disclosure, the term "encode" is synonymous with the term "populate."

When creating an indirect command buffer based on graphics API calls, the graphics driver may establish a variety of settings for the indirect command buffer. Examples of settings that the graphics driver may establish for an indirect command buffer include (1) the type of commands that may be populated within the indirect command buffer; (2) maximum logical stride length (e.g., in bytes) for each command within command buffer; (3) features used in the indirect command buffer; (4) whether the render or compute pipeline inherits buffers from the parent command encoder; (5) maximum bind count for different argument buffers (e.g., vertex argument buffers, fragment argument buffers, kernel argument buffers) that can be set per command; and (6) maximum number of commands that the indirect command buffer can contain. After creating an indirect command buffer, but prior to encoding the indirect command buffer, the indirect command buffer represents an opaque data structure stored within memory and is adapted to encode render commands (e.g., draw calls) or compute commands (e.g., dispatch calls) at a later point in time. The indirect command buffer may be encoded by a graphics processor or a general-purpose processor at a later point in time after the graphics driver creates the indirect command buffer.

In contrast to a command buffer that a graphics driver typically generates, the graphics processor hardware 105 can re-execute the same indirect command buffer any number of times. As an example, the graphics driver can generate a single command buffer that includes multiple consume commands that reference the same indirect command buffer. The consume commands can be located within the same command encoder or across different command encoders. Additionally or alternatively, the graphics driver can generate multiple command buffers, where each command buffer includes a consume command that references the same indirect command buffer. The graphics processor hardware can re-execute the indirect command buffer as along as the indirect command buffer is not already in flight.

The graphics driver could also receive graphics API calls that generate other types of commands for the indirect command buffer. The other types of commands may be encoded within the same command buffer or in different command buffer. Examples of other types of commands include commands to copy an indirect command buffer, optimize an indirect command buffer, and reset an indirect command buffer. A command to copy an indirect command buffer, when executed by the graphics processor hardware 105, copies contents from a source indirect command buffer to a destination indirect command buffer. A command to optimize an indirect command buffer, when executed by the graphics processor hardware 105, removes, in some examples, redundant state settings and/or performs memory compaction operations that move un-encoded command spaces within the indirect command buffer to specific locations within the indirect command buffer (e.g., toward the end of the indirect command buffer). A command to reset an indirect command buffer, when executed by the graphics processor hardware 105, deletes, in some examples, the contents of indirect command buffer to allow the graphics processor hardware 105 to encode new commands. In particular, after performing a reset, when a graphics processor hardware 105 receives a subsequent produce command, the graphics processor hardware 105 is able to encode new commands within the indirect command buffer that the graphics processor hardware 105 may execute after receiving a consume command.

Although FIG. 1 illustrates a specific implementation of graphics processing path 100, the disclosure is not limited to the specific implementation illustrated in FIG. 1. For instance, graphics processing path 100 may include other frameworks, APIs, and/or application layer services not specifically shown in FIG. 1. As an example, application 101 may have access to Core Animation to animate views and/or user interfaces for application 101. FIG. 1 also does not illustrate all of the hardware resources and/or components that graphics processing path 100 may utilize (e.g., power management units or memory resources, such as cache or system memory). Additionally or alternatively, even though FIG. 1 illustrates that processor resource 110 and graphics processor resource 112 are separate devices, other implementations could have the processor resource 110 and graphics processor resource 112 integrated on a single device (e.g., a system-on-chip). The use and discussion of FIG. 1 is only an example to facilitate ease of description and explanation.

Figure 2:
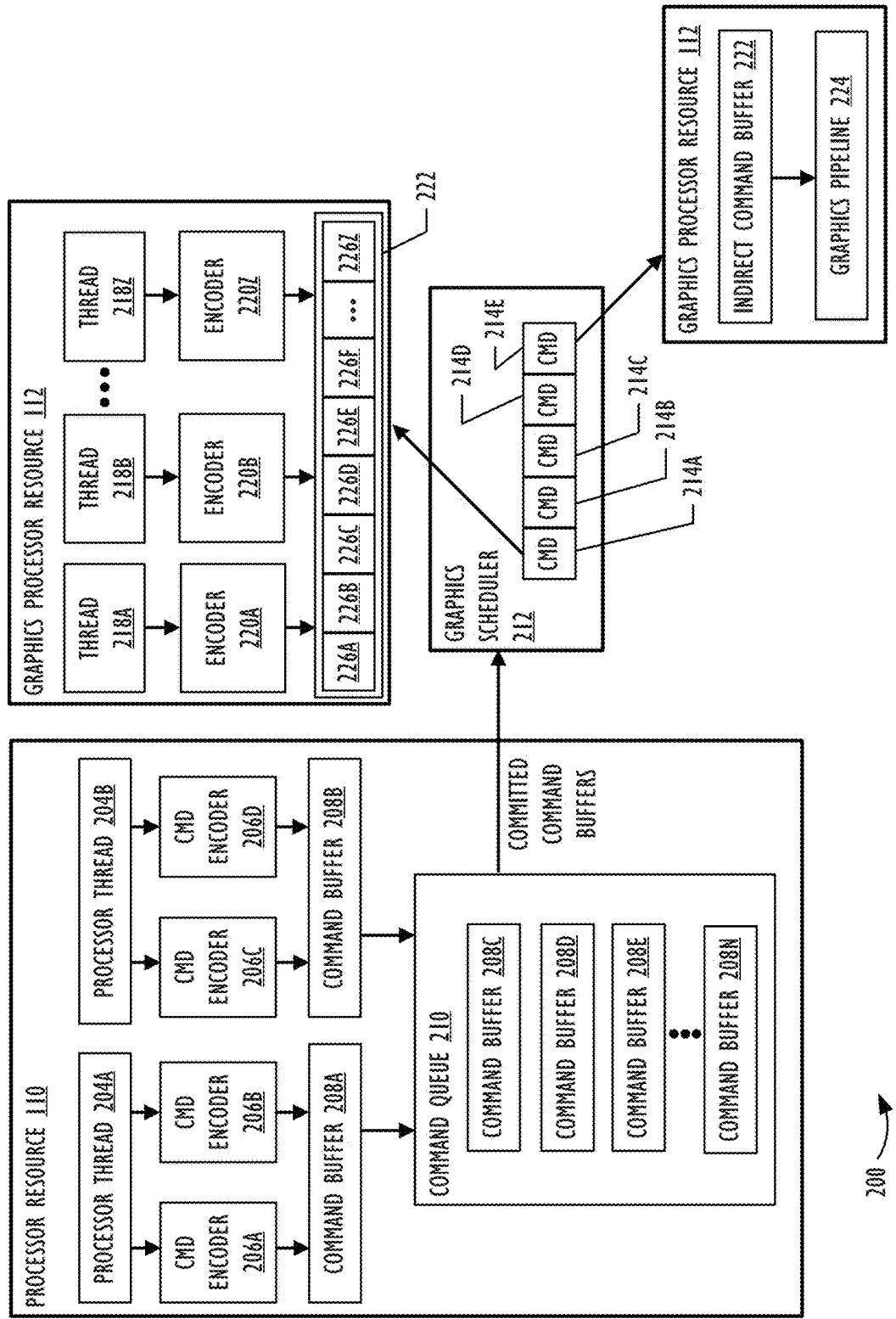
FIG. 2 is a block diagram of a system where implementations of the present disclosure may operate.

FIG. 2 is a block diagram of a system 200 where implementations of the present disclosure may operate. FIG. 2 illustrates that system 200 includes a processor resource 110 and a graphics processor resource 112. FIG. 2 illustrates processor threads 204A and 204B. Processor thread 204A is tasked with utilizing command encoders 206A and 206B and processor thread 204B is tasked with utilizing command encoder 206C and 206D. The command encoders 206A and 206B encode commands within command buffer 208A and command encoders 206C and 206D encode commands within command buffer 208B. A different number of processor threads and command encoders can be included in other implementations compared to two processor threads and four command encoders shown in the example of FIG. 2. The command encoders 206A-206D represents encoders that write commands into command buffers 208A and 208B for the graphics processor resource 112 to execute. Examples of command encoder types include, but are not limited to, Blit command encoders (e.g., graphics API resource copy and graphics API resource synchronization commands), compute command encoders (e.g., compute commands), and render command encoders (e.g., render commands).

Command buffers 208A and 208B, which are also referred to as "command lists," represent data structures that store a sequence of encoded commands for graphics processor resource 112 to execute. When one or more graphics API calls present and commit command buffers 208A and 208B to a graphics driver (e.g., the user space driver 102 shown FIG. 1), the processor resource 110 organizes the command buffers 208A and 208B into a command queue 210. The command queue 210 organizes the order in which command buffers 208 are sent to graphics processor resource 112 for execution. Using FIG. 2 as an example, command queue 210 contains command buffers 208C-208N, where command buffer 208C is at the top of the command queue 210 and is the next command buffer 208C to be sent to graphics processor resource 112 for execution. When processor resource 110 commits command buffers 208A and 208B for execution, the processor resource 110 is unable to encode any additional commands into command buffers 208A and 208B.

After committing a command buffer 208, the graphics scheduler 212 within system 200 obtains the command buffer 208 and schedules and prioritizes commands within the command buffer 208 for execution. With reference to FIG. 1 as an example, the graphics scheduler 212 can be implemented by a microcontroller that executes the graphics processor firmware 104. Specifically, the microcontroller could be embedded in the same package as a graphics processor within the graphic processor resource 112 and setup to pre-process commands for the graphics processor. In other implementations, the microcontroller is physically separated from the graphics processor. Additionally or alternatively, at least some of the scheduling operations performed by graphics scheduler 212 could run on a graphics driver kernel executing on processor resource 110. In FIG. 1, the graphics driver kernel would correspond to kernel driver 103.

FIG. 2 illustrates that the graphics scheduler 212 has scheduled commands 214A-214E for execution on the graphics processor resource 112. In the example of FIG. 2, command 214A represents a produce command that, when executed at a later point in time, populates commands 226A-226Z within a referenced indirect command buffer 222. Command 214A acts an intervening API call (e.g., not graphics API calls from application 101 shown in FIG. 1) to access execution cores within graphics processor resource 112. In other words, having graphics processor resource 112 encode commands within the indirect command buffer 222 at a later point time exposes the pipeline state to a developer. In one implementation, command 214A is an indirect render command that causes graphics processor resource 112 to populate render commands 226A-226Z. In another implementation, command 214A is an indirect compute command that causes graphics processor resource 112 to populate compute commands 226A-226Z. When the graphics processor resource 112 executes command 214A, the graphics processor resource 112 may obtain the size of the referenced indirect command buffer 222 and memory destination for the graphics processor resource 112 to encode and source out commands. Afterwards, to encode and source out commands, the graphics processor threads 218A-218Z are each tasked with utilizing encoders 220A-220Z to encode commands 226A-226Z within indirect command buffer 222. As shown in FIG. 2, each graphics processor thread 218A-218Z may encode in parallel different commands 226A-226Z within the indirect command buffer.

Having command 214A act as an intervening API call (e.g., not graphics API calls from application 101 shown in FIG. 1) to access the graphics processor resource's 112 execution cores provide a developer additional flexibility in populating commands 226A-226Z within the indirect command buffer 222. In particular, commands 226A-226Z are encoded directly into a language that the hardware of graphics processor resource 112 is able to understand. By doing so, indirect command buffer 222 could include commands 226A-226Z that utilize different primitive types or draw call types. As an example, graphics processor resource 112 encodes command 226B to utilize triangle primitive types for drawing an object and encodes command 226D to utilize a dot primitive type for drawing another object. Graphics processor resource 112 may also encode different draw call types for commands 226A-226Z, such as: (1) a draw call that includes a list of primitives; (2) a draw call that includes an indexed list of primitives; (3) a tessellation draw call that includes a list of patches; and/or (4) a tessellation draw call that includes an indexed list of patches. For example, graphics processor resource 112 encodes command 226B to utilize a draw call that includes a list of primitives and command 226E to utilize a draw call that includes an indexed list of primitives In contrast, some graphics APIs have a developer declare a fixed format structure for graphics API calls (e.g., draw calls) that encode indirect buffers. Typically, the graphics driver (e.g., user space driver 102 shown in FIG. 1) perform an additional translation step to convert the commands into executable data for graphics processor resource 112. The fixed format structure and additional translation step, however, prevent commands from an indirect buffer from utilizing different primitive types or draw call types. Using FIG. 2 as an example, processor resource 110 may encode command 214B to set the primitive type to triangles for an indirect buffer. Commands within the indirect buffer draw objects using the declared triangle primitive type. That is, commands within the indirect buffer inherit the primitive type set by command 214B. Commands within the indirect buffer would be unable to draw objects using other primitive types, such as point, line, line strip, or triangle strip. Additionally, commands within the indirect buffer would have the same draw type as command 214B.

FIG. 2 also depicts that command 214E represents a consume command that causes the execution of encoded commands 226A-226Z within the referenced indirect command buffer 222. As previously discussed, graphics processor resource 112 encodes commands 226A-226Z based on the execution of command 214A. Once graphics processor resource 112 finishes encoding commands 226A-226Z, the graphics scheduler 212 may subsequently schedule a command 214E for execution. When graphics processor resource 112 executes command 214E, the graphics processor resource 112 executes the indirect command buffer 222 using graphics pipeline 224. If the indirect command buffer 222 includes compute commands, the graphics pipeline 224 is a compute pipeline. Conversely, if the indirect command buffer 222 includes render commands, the graphics pipeline 224 is a graphics rendering pipeline.

Although FIG. 2 illustrates a specific implementation of a system 200 to encode and consume indirect command buffers 222, the disclosure is not limited to the specific implementation illustrated in FIG. 2. For instance, although FIG. 2 illustrates that commands 226A-Z are encoded using a graphics processor resource 112, system 200 could also be configured to encode the indirect command buffer 222 using processor resource 110. Additionally, even though FIG. 2 illustrates a single command queue 210; persons of ordinary skill in the art are aware that command buffers 208 can be placed into additional command queues 210 not shown in FIG. 2. The use and discussion of FIG. 2 is only an example to facilitate ease of description and explanation.

Figure 3:
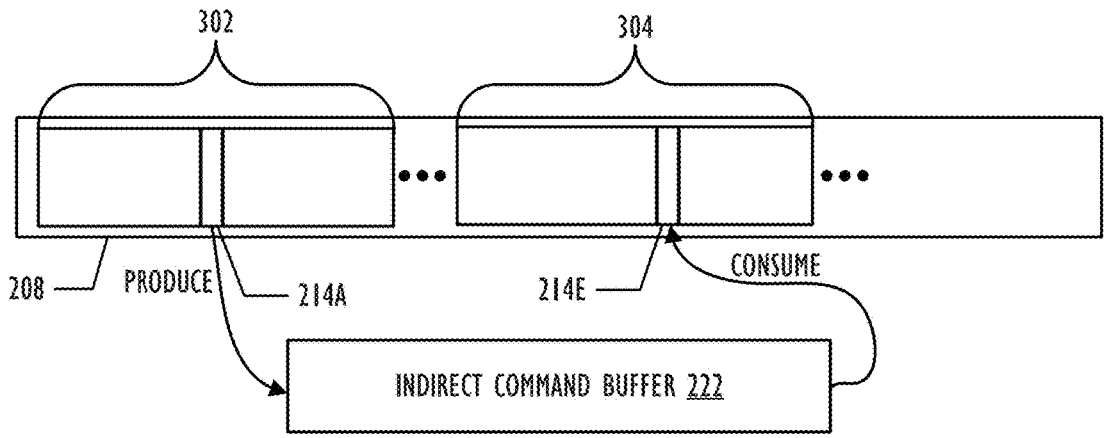
FIG. 3 is an implementation of a command buffer that includes commands that produce and consume an indirect command buffer.

FIG. 3 is an implementation of a command buffer 208 that includes commands that produce and consume an indirect command buffer 222. Recall that a general-purpose processor (e.g., a CPU) presents and commits a command buffer 208 for execution on a graphics processor. After the general-purpose processor commits the command buffer 208, the general-purpose processor is unable to encode additional commands into the command buffer 208. FIG. 3 illustrates that the command buffer 208 includes two different sections 302 and 304. Section 302 represents commands that a command encoder (e.g., a compute command encoder) appends to command buffer 208, and section 304 represents commands that a different command encoder (e.g., a render command encoder) appends to command buffer 208. Each command encoder may be associated with specific graphics API resources (e.g., buffers and textures) and states (e.g., stencil state and pipeline state) for encoding the commands within each section 302 and 304 of command buffer 208.

Within section 302, command 214A represents a produce command that allows for populating commands within the indirect command buffer 222 at a later point in time. As an example, command 214A can be a compute kernel (e.g., dispatch call) that starts a graphics pipeline to encode commands within indirect command buffer 222. Section 304 contains command 214E that represents a consume command that triggers the execution of the indirect command buffer 222. As an example, command 214E can be a shader (e.g., a draw call) that starts a graphics pipeline to execute commands within indirect command buffer 222.

Figure 4:
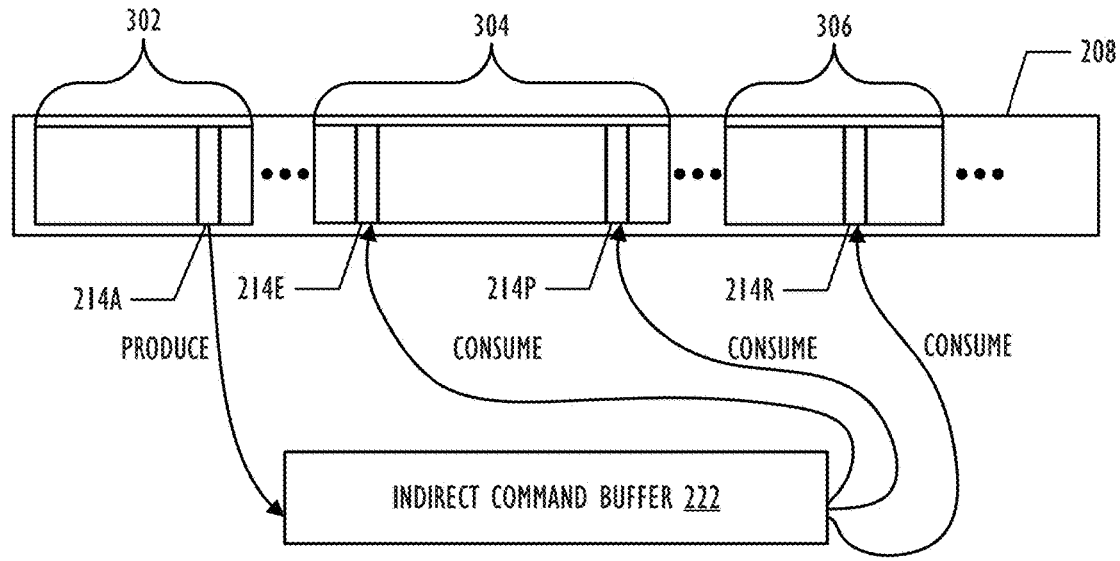
FIG. 4 is an implementation of a command buffer that includes multiple consume commands for an indirect command buffer.

FIG. 4 is an implementation of a command buffer 208 that includes multiple consume commands for an indirect command buffer 222. FIG. 4 is similar to FIG. 3 except that FIG. 4 illustrates an additional section 306 and commands 214P and 214R. The additional section 306 corresponds to commands that another command encoder (e.g., another render command encoder) appends to command buffer 208. Commands 214P and 214R represents additional consume commands that cause the graphics processor to re-execute the indirect command buffer 222 after the graphics processor executes command 214E. As shown in FIG. 4, command 214P causes a graphics processor to re-execute the indirect command buffer 222 within the same command encoder as command 214E. Command 214R causes the graphics processor to re-execute the indirect command buffer 222 at a different command encoder.

Figure 5:
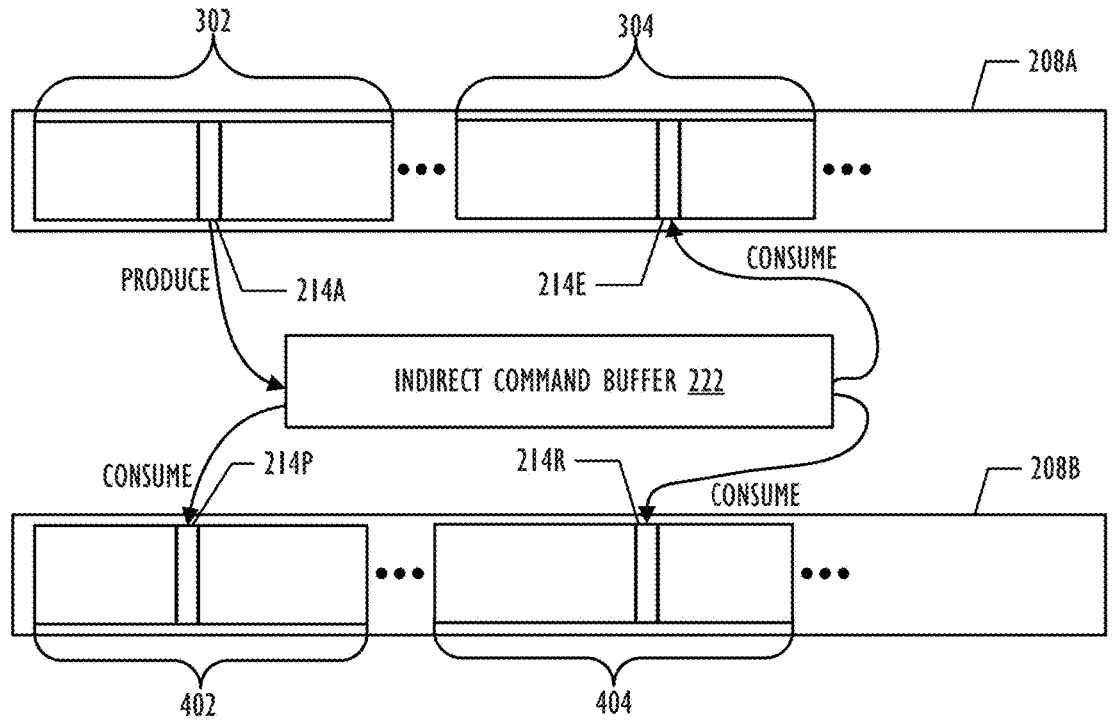
FIG. 5 is an implementation of multiple command buffers that include consume commands that reference the same indirect command buffer.

FIG. 5 is an implementation of multiple command buffers 208A and 208B that include consume commands that reference indirect command buffer 222. FIG. 5 is similar to FIG. 3 except that FIG. 5 illustrates an additional command buffer 208B that includes commands 214P and 214R. As shown in FIG. 5, command buffer 208A includes command 214A that causes a graphic processor to produce the indirect command buffer 222 and command 214E that causes the graphic processor to execute the indirect command buffer 222. A different command buffer 208B includes sections 402 and 404, where each section 402 and 404 corresponds to commands that different command encoders (e.g., a render command encoder) append to command buffer 208B. Commands 214P and 214R represent additional consume commands that cause the graphics processor to re-execute encoded commands within the same indirect command buffer 222 after the graphics processor executes command 214E.

Figure 6:
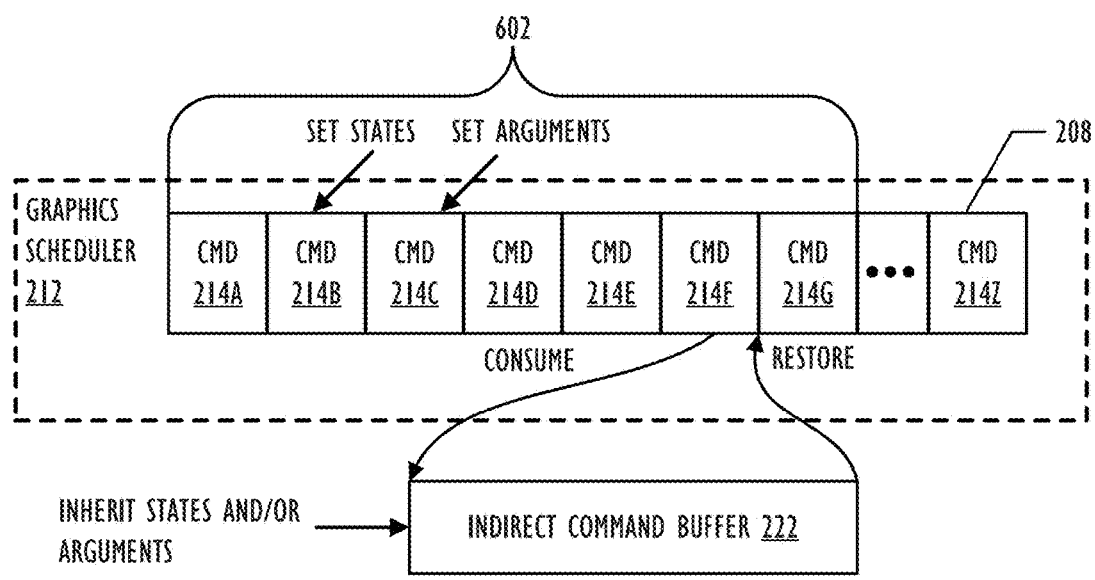
FIG. 6 illustrates that an indirect command buffer can inherit states and arguments from commands associated with the same parent command encoder.

FIG. 6 illustrates that an indirect command buffer 222 can inherit states and arguments from commands associated with the same parent command encoder. In FIG. 6, a graphics scheduler 212 includes commands 214A-214Z that correspond to a command buffer 208. Command 214B represents a graphics API command that sets certain states, such as the pipeline state. For example, if the parent command encoder is a render command encoder, then command 214B sets a render pipeline state that subsequent commands 214, such as commands 214C-214E, may utilize. If the parent command encoder is a compute command encoder, then command 214B sets a compute pipeline state for subsequent commands 214. Command 214C represents a graphics API command that sets one or more arguments (e.g., parameters for the pipeline state) for the graphics pipeline. Commands 214D and 214E represent commands that do not modify the states or arguments set by commands 214B or 214C, respectively. For example, commands 214D and 214E utilize the shader and shader parameters set by commands 214B and 214C to perform draw calls.

Section 602 of the command buffer 608 corresponds to commands (e.g., commands 214A-214G) that a parent command encoder appends to command buffer 208. The parent command encoder refers to the command encoder that appends command 214F, which represents a consume command that executes indirect command buffer 222. When a graphics processor executes encoded commands within indirect command buffer 222, the indirect command buffer 222 may be able to inherit one or more states and/or one or more arguments set by the parent command encoder within command buffer 208. For example, when a graphics processor executes commands in the indirect command buffer 222, the graphics processor may inherit just the states set by command 214B, just the arguments set by command 214C, or both the states and arguments set by commands 214B and 214C, respectively. Stated another way, the indirect command buffer 222 is able to independently inherit the last states and/or arguments set by the parent command encoder prior to executing the indirect command buffer 222.

When the indirect command buffer 222 does not inherit states and/or arguments from previous commands (e.g., 214B and 214C) associated with the parent command encoder, commands within the indirect command buffer 222 may subsequently set the states and/or arguments. As an example, recall that the graphics API exposes the pipeline state to a developer when populating commands within the indirect command buffer 222. If the indirect command buffer 222 does not inherit the pipeline state from the parent command encoder, then each command within the indirect command buffer 222 may set and override prior pipeline state values. In some implementations, the indirect command buffer 222 may be unable to inherit certain states and/or arguments from the parent command encoder. As an example, an indirect command buffer 222 can be configured to not inherit textures and samplers from the parent command encoder. Additionally, the indirect command buffer 222 may be unable to inherit states from the parent command encoder, such as depth stencil state, cull mode, winding order, viewport, and scissor rectangle.

FIG. 6 also illustrates that any states or arguments that the indirect command buffer 222 modifies, a graphics driver is able to subsequently restore the modified states and/or arguments back to values prior to executing the indirect command buffer 222. As a graphics processor executes commands within the indirect command buffer 222, states and/or arguments initially set by commands 214B and 214C, respectively, may change. To prevent subsequent commands 214 (e.g., command 214G) within command buffer 208 from utilizing modified states and/or arguments generated from executing indirect command buffer 222, the graphics driver restores states and/or arguments to values prior to executing the indirect command buffer 222. For example, after a graphics processor finishes executing indirect command buffer 222, a graphics driver may restore the states and/or arguments set by commands 214B and 214C, respectively, prior to executing command 214G.

Figure 7:
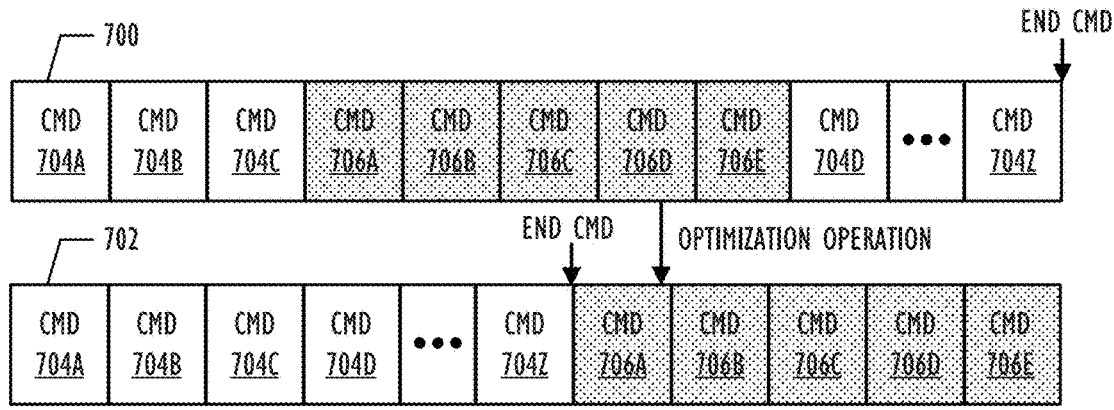
FIG. 7 illustrates that an un-optimized indirect command buffer can be optimized to form an optimized indirect command buffer.

FIG. 7 illustrates that an un-optimized indirect command buffer 700 can be optimized to form an optimized indirect command buffer 702. To produce the optimized indirect command buffer 702, a graphics processor may execute an optimization command after populating the indirect command buffer 222, but before executing the indirect command buffer 222. With reference to FIG. 2 as an example, the optimization command may correspond to command 214C, which is located after command 214A (e.g., produce command) and before command 214E (e.g., consume command) within the graphics scheduler 212. When a graphics processor executes the optimization command, the graphics processor performs an optimization operation that transforms the un-optimized indirect command buffer 700 to an optimized indirect command buffer 702. In one or more implementations, the optimization operation performs a memory compaction operation to generate the optimized indirect command buffer 702. Additionally or alternatively, the optimization operation removes redundant state settings for commands encoded within the encoded command spaces 704.

FIG. 7 depicts that the optimization command that performs a memory compaction operation to cluster encoded command spaces 704A-704Z together and cluster un-encoded command spaces 706A-706E together. Recall that prior to populating the indirect command buffer 222, the indirect command buffer 222 is an opaque data structure stored with memory. Since a graphics processor includes many different threads for performing parallel processing, different threads may simultaneously populate different commands within the indirect command buffer 222. As a result, the encoded indirect command buffer 222 may include one or more patches of un-encoded command spaces 706. FIG. 7 illustrates that un-optimized indirect command buffer 700 includes a single patch of un-encoded command space 706.

As previously discussed, the graphics processor may include a microcontroller that reads and schedules commands for execution by the graphics processor's execution cores. For example, a microcontroller may read a draw command containing triangle primitives and schedules vertex processing onto execution cores, followed by scheduling pixel fragments onto execution cores. The microcontroller reads and schedules the commands serially from the un-optimized indirect command buffer 700. Having the microcontroller read un-encoded command space 706 wastes processing time on empty commands. Using FIG. 7 as an example, the microcontroller wastes time processing empty commands within the un-encoded command spaces 706A-706E for un-optimized indirect command buffer 700.

In contrast to the un-optimized indirect command buffer 700, the optimization operation has moved all of the un-encoded command spaces 706A-706E to the back and all of encoded command spaces 704A-704Z to the front of the optimized indirect command buffer 702. By having the encoded command spaces 704A-704Z moved to the front of the optimized indirect command buffer 702, the microcontroller is able to process the commands within the encoded command spaces 704A-704Z without processing un-encoded command spaces 706A-706E. Once the microcontroller processes the last command within encoded command space 704Z, the microcontroller returns back to the command buffer to continue execution. By doing so, the microcontroller ignores un-encoded command spaces 706A-706E.

In one or more implementations, the optimization command is able to remove redundant state settings for commands encoded within the encoded command spaces 704. A consequence of not inheriting states from a parent command encoder is that commands in the un-optimized indirect command buffer 700 may continuously set the states even if redundant. Using FIG. 7 as an example, commands within encoded command space 704A, 704B, and 704C may have the same state settings. In situations where the states are not previously inherited from the parent command encoder, the graphics processor would spend time setting the state for each command within encoded command space 704A, 704B, and 704C when executing the un-optimized indirect command buffer 700. To reduce redundant state settings and the associated cost when executing the un-optimized indirect command buffer 700, the optimization operation is able to remove the redundant state settings within the optimized indirect command buffer 702. In one or more implementation, graphics processor may remove redundant states within a specified range of commands. Having a specified range of commands with removed redundant states (e.g., remove redundant states across 64 or 128 draw calls) may achieve a desired parallelization while reducing redundant states. Although removing all of the redundant states within the optimized indirect command buffer 702 could reduce the amount of time the graphics processor spends setting state values, the graphics processor no longer is able to process commands in parallel, and instead slowly processes the entire optimized indirect command buffer 702 serially.

Figure 8:
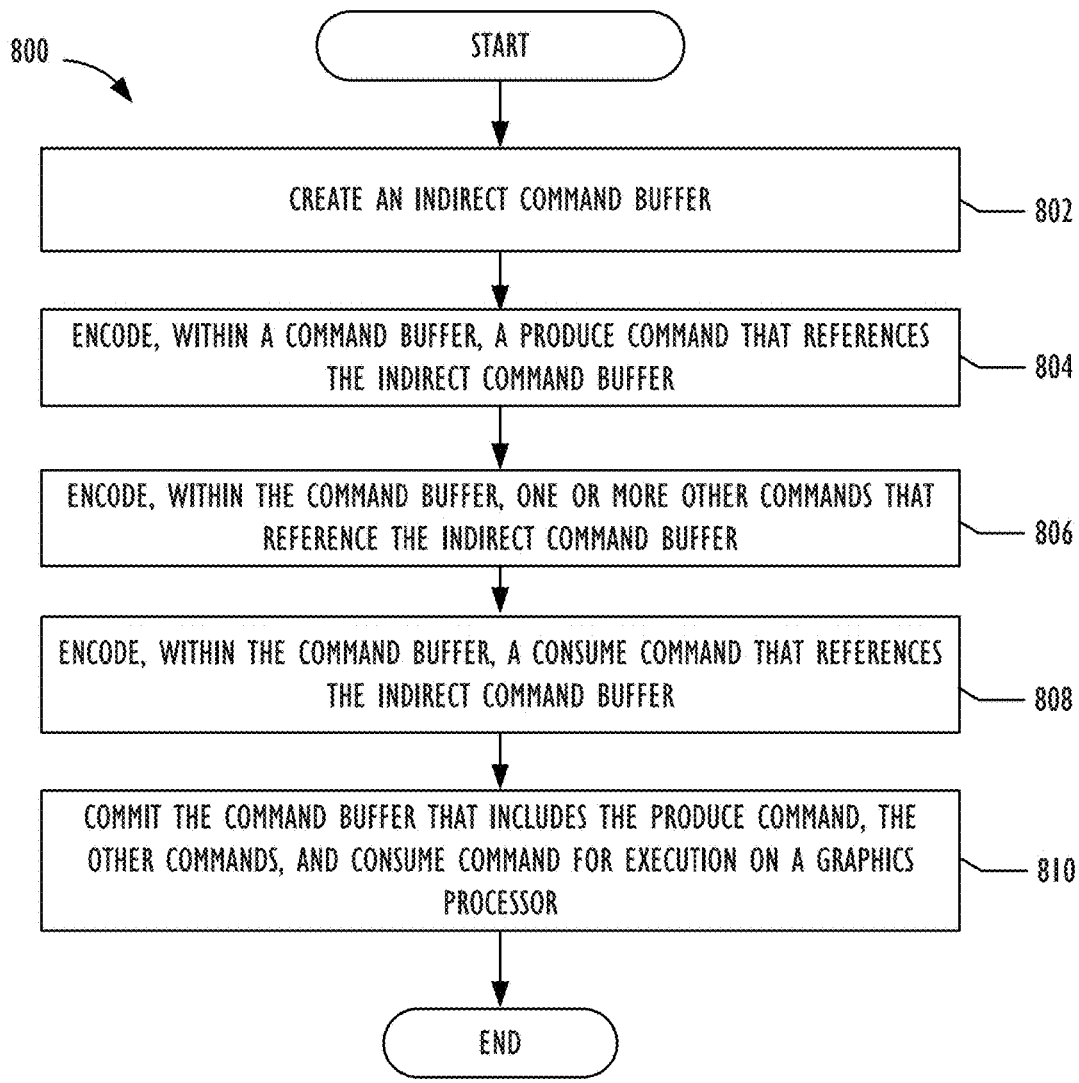
FIG. 8 depicts a flowchart illustrating a graphics processing operation for encoding commands within a command buffer to populate and execute an indirect command buffer.

FIG. 8 depicts a flowchart illustrating a graphics processing operation 800 for encoding commands within a command buffer to populate and execute an indirect command buffer. In one implementation, operation 800 may be implemented by processor resource 110 shown in FIGS. 1 and 2. For example, operation 800 may be implemented by a CPU of a computing system. Specifically, blocks within operation 800 could be implemented by the user space driver 102 and kernel driver 103 shown in FIG. 1. The use and discussion of FIG. 8 is only an example to facilitate explanation and is not intended to limit the disclosure to this specific example. For example, block 806 may be optional such that operation 800 may not perform block 806 in all implementations of operation 800.

Operation 800 may start at block 802 and create an indirect command buffer. When operation 800 creates an indirect command buffer, operation 800 may establish a variety of settings for the indirect command buffer. Examples of settings that operation 800 may establish for an indirect command buffer include (1) the type of commands that may be populated within the indirect command buffer; (2) maximum logical stride length (e.g., in bytes) for each command within command buffer; (3) features used in the indirect command buffer; (4) whether the render or compute pipeline inherits buffers from the parent command encoder; (5) maximum bind count for different argument buffers (e.g., vertex argument buffers, fragment argument buffers, kernel argument buffers) that can be set per command; and (6) maximum number of commands that the indirect command buffer can contain. In one or more implementations, the indirect command buffer may be configured to have a constant stride length so that graphics processor threads are able to independently and concurrently encode each command within the indirect command buffer.

At block 804, operation 800 encodes, within a command buffer, a produce command that references the indirect command buffer. Recall that after operation 800 creates the indirect command buffer, the indirect command represents an opaque data structure stored with memory. Operation 800 does not define the layout of the indirect command buffer. Instead, the layout of the indirect command buffer occurs when a graphics processor subsequently executes the produce command encoded within the command buffer. By having a graphics processor encode the indirect command buffers, commands within the indirect command buffers are encoded directly into a language that the hardware of graphics processor is able to understand and execute.

Operation 800 may then move to block 806 and encode, within the command buffer, one or more other commands that reference the indirect command buffer. For example, operation 800 may encode an optimization command that causes a graphics processor to perform memory compaction operations and/or remove redundant state settings for a specified number of commands. In another example, operation 800 can copy the referenced indirect command buffer to a destination indirect command buffer. Operation 800 may then move to block 808 and encode, within the command buffer, a consume command that references the indirect command buffer. A graphics processor may execute the referenced indirect command buffer when the graphics processor executes the consume command at a later point in time. Afterwards, operation 800 may then move to block 810 and commit the command buffer that includes the produce command, the optimization command, and the consume command for execution on the graphics processor. Once operation 800 commits the command buffer, operation 800 is unable to encode any additional commands to the command buffer.

Figure 9:
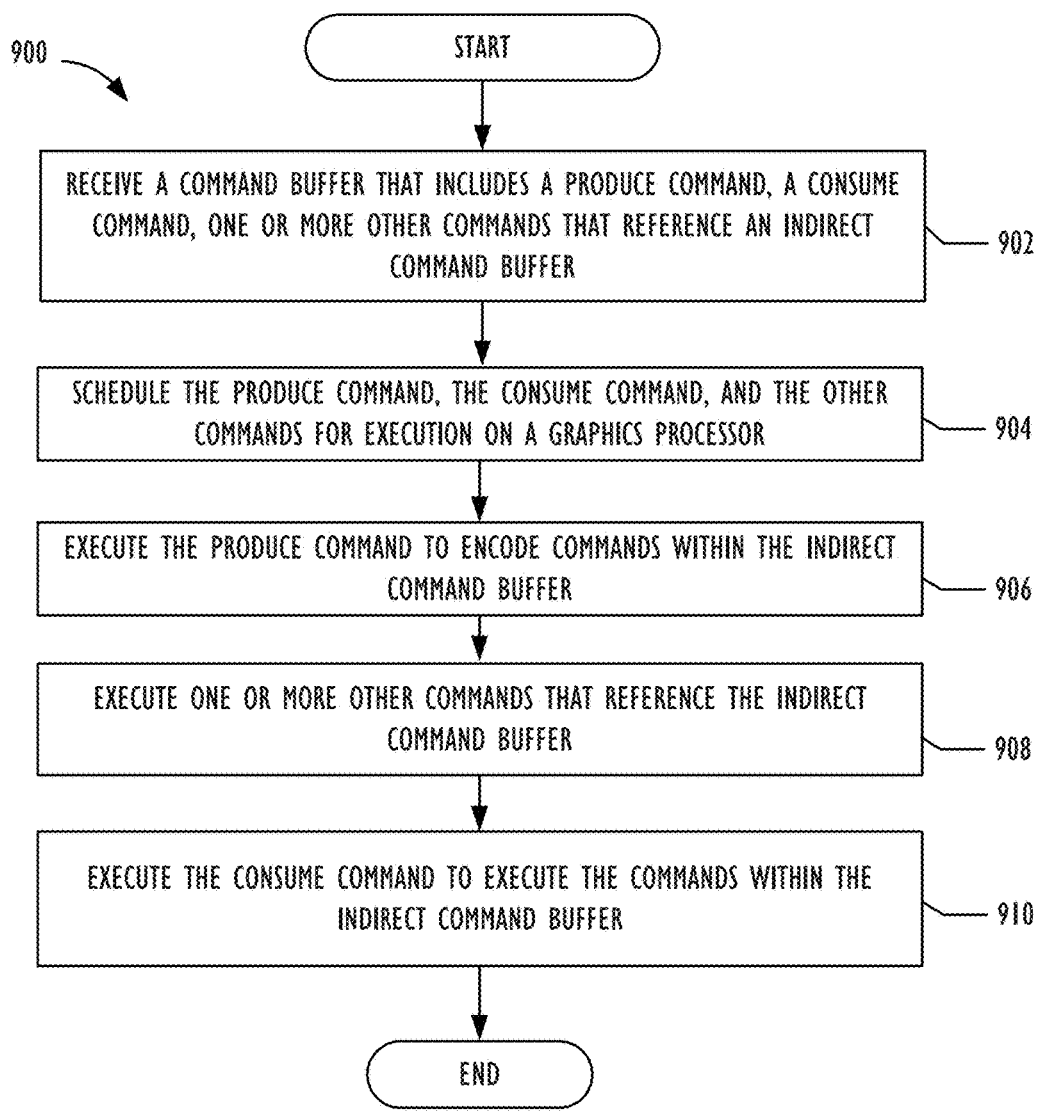
FIG. 9 depicts a flowchart illustrating a graphics processing operation for populating and executing an indirect command buffer.

FIG. 9 depicts a flowchart illustrating a graphics processing operation 900 for populating and executing an indirect command buffer. In one implementation, operation 900 may be implemented by graphics processor resource 112 shown in FIGS. 1 and 2. For example, operation 900 may be implemented by a GPU of a computing system. Specifically, blocks within operation 900 could be implemented by an embedded microcontroller and execution cores within the GPU. The use and discussion of FIG. 9 is only an example to facilitate explanation and is not intended to limit the disclosure to this specific example. For example, block 908 may be optional such that operation 900 may not perform block 906 in all implementations of operation 900.

Operation 900 may start at block 902 and receive a command buffer that includes a produce command, a consume command, and one or more other commands that reference an indirect command buffer. Examples of other commands that may be found within the command buffer include a command to copy the indirect command buffer to a destination command buffer, a command to optimize an indirect command buffer, and a command to reset an indirect command buffer to encode new commands within the indirect command buffer. Afterwards, operation 900 proceeds to block 904 and schedules the produce command, the consume command, and the other commands for execution on a graphics processor.

At block 906, operation 900 executes a produce command to encode commands within the indirect command buffer. As previously disclosed, a produce command acts an intervening API call that accesses execution cores within a graphics processor that exposes the pipeline state to a developer and encodes commands within the indirect command buffer directly into a language that the graphics processor's hardware is able to understand. By doing so, commands within the indirect command buffer can utilize different primitive types or draw call types. As an example, operation 900 can encode one command to utilize triangle primitive types for drawing an object and encodes a subsequent command to utilize a dot primitive type for drawing another object.

Operation 900 then moves to block 908 and executes one or more of the other commands that reference the indirect command buffer. For example, operation 900 may receive a command to reset and delete the contents within the indirect command buffer within the same command buffer. By resetting the indirect command buffer, operation 900 could encode new commands within the indirect command buffer prior to executing the indirect command buffer. Other implementations could have operation 900 receive the other commands from other command buffers. Operation 900 could then continue to block 910 and execute the consume command to execute the commands within the indirect command buffer.

Illustrative Hardware and Software

The disclosure may have implication and use in and with respect to variety of electronic devices, including single- and multi-processor computing systems, and vertical devices (e.g., cameras, gaming systems, appliances, etc.) that incorporate single- or multi-processing computing systems. The discussion herein is made with reference to a common computing configuration for many different electronic computing devices (e.g., computer, laptop, mobile devices, etc.). This common computing configuration may have a CPU resource including one or more microprocessors and a graphics processing resource including one or more GPUs. Other computing systems having other known or common hardware configurations (now or in the future) are fully contemplated and expected. While the focus of some of the implementations relate to mobile systems employing minimized GPUs, the hardware configuration may also be found, for example, in a server, a workstation, a laptop, a tablet, a desktop computer, a gaming platform (whether or not portable), a television, an entertainment system, a smart phone, a phone, or any other computing device, whether mobile or stationary, vertical, or general purpose.

Figure 10:
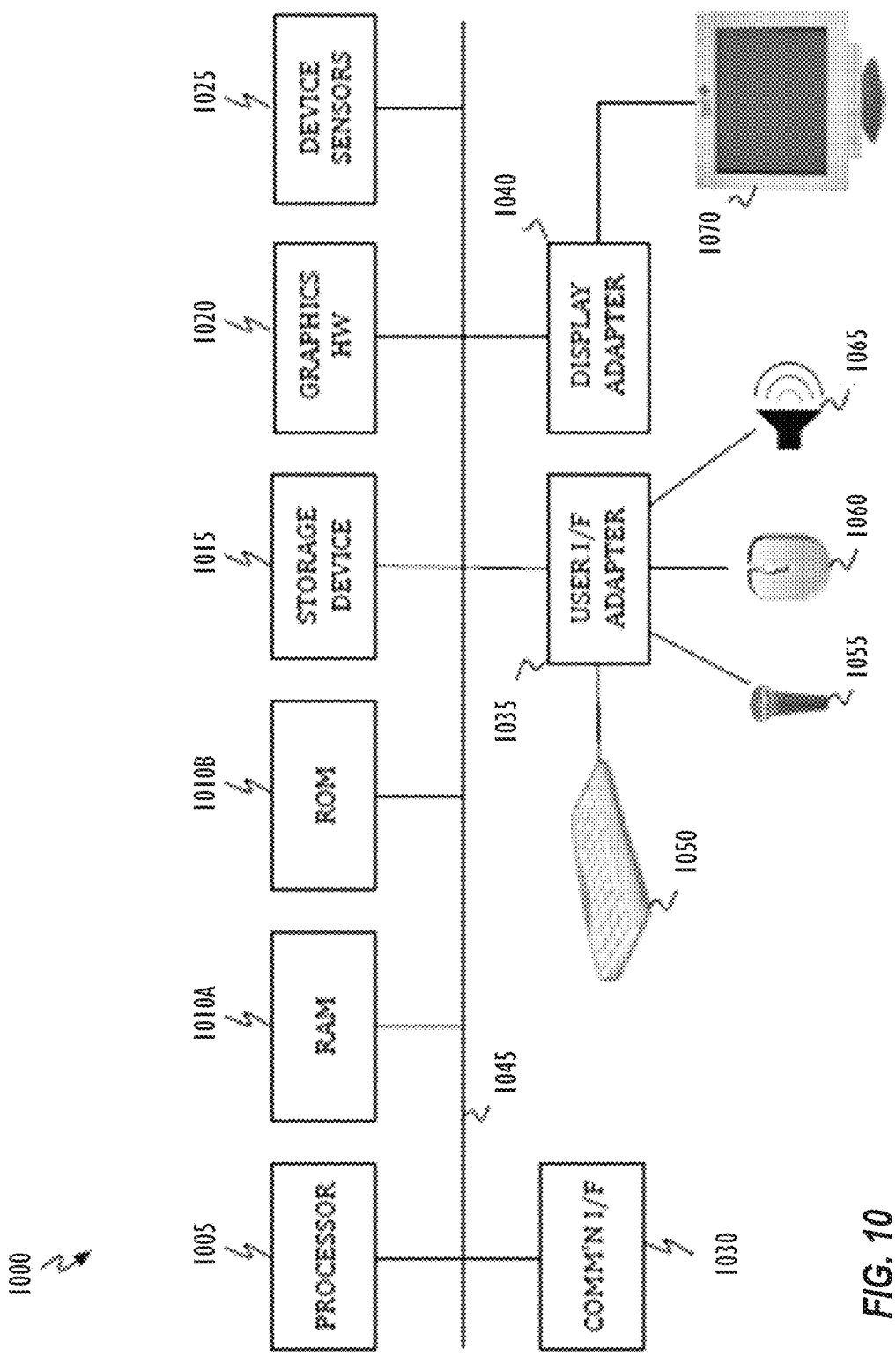
FIG. 10 is a block diagram of a computing system where implementations of the present disclosure may operate.

Referring to FIG. 10, the disclosed implementations may be performed by representative computing system 1000. For example the representative computer system may act as an end-user device or any other device that produces or displays graphics. For example, computing system 1000 may be embodied in electronic devices, such as a general purpose computer system, a television, a set top box, a media player, a multi-media entertainment system, an image processing workstation, a hand-held device, or any device that may be coupled with or may incorporate display or presentation devices as discussed herein. Computing system 1000 may include one or more processors 1005, memory 1010 (1010A and 1010B), one or more storage devices 115, and graphics hardware 1020 (e.g., including one or more graphics processors). Computing system 1000 may also have device sensors 1025, which may include one or more of: depth sensors (such as a depth camera), 3D depth sensor(s), imaging devices (such as a fixed and/or video-capable image capture unit), RGB sensors, proximity sensors, ambient light sensors, accelerometers, gyroscopes, any type of still or video camera, LIDAR devices, SONAR devices, microphones, CCDs (or other image sensors), infrared sensors, thermometers, etc. These and other sensors may work in combination with one or more GPUs, DSPs or conventional microprocessors along with appropriate programming so the sensor outputs may be properly interpreted and/or combined and interpreted.

Returning to FIG. 10, system 1000 may also include communication interface 1030, user interface adapter 1035, and display adapter 1040—all of which may be coupled via system bus, backplane, fabric or network 1045. Memory 1010 may include one or more different types of non-transitory media (e.g., solid-state, DRAM, optical, magnetic, etc.) used by processor 1005 and graphics hardware 120. For example, memory 1010 may include memory cache, read-only memory (ROM), and/or random access memory (RAM). Storage 1015 may include one or more non-transitory storage media including, for example, magnetic disks (fixed, floppy, and removable) and tape, optical media such as CD-ROMs and digital video disks (DVDs), and semiconductor memory devices such as Electrically Programmable Read-Only Memory (EPROM), solid state storage drives, and Electrically Erasable Programmable Read-Only Memory (EEPROM). Memory 1010 and storage 1015 may be used to retain media data (e.g., audio, image, and video files), preference information, device profile information, computer program instructions organized into one or more modules and written in any desired computer programming language, and any other suitable data. When executed by processor 1005 and/or graphics hardware 1020, such computer program code may implement one or more of operations or processes described herein. In addition, the system may employ microcontrollers (not shown), which may also execute such computer program code to implement one or more of the operations or computer readable media claims illustrated herein. In some implementations, the microcontroller(s) may operate as a companion to a graphics processor or a general-purpose processor resource.

Communication interface 1030 may include semiconductor-based circuits and may be used to connect computing system 1000 to one or more networks. Illustrative networks include, but are not limited to: a local network, such as a USB network; a business's local area network; and a wide area network such as the Internet and may use any suitable technology (e.g., wired or wireless). Communications technologies that may be implemented include cell-based communications (e.g., LTE, CDMA, GSM, HSDPA, etc.) or other communications (Apple lightning, Ethernet, WiFi®, Bluetooth®, USB, Thunderbolt®, Firewire®, etc.). (WIFI is a registered trademark of the Wi-Fi Alliance Corporation. BLUETOOTH is a registered trademark of Bluetooth Sig, Inc. THUNDERBOLT and FIREWIRE are registered trademarks of Apple Inc.). User interface adapter 135 may be used to connect keyboard 150, microphone 155, pointer device 160, speaker 165, and other user interface devices such as a touchpad and/or a touch screen (not shown). Display adapter 140 may be used to connect one or more displays 170.

Processor 1005 may execute instructions necessary to carry out or control the operation of many functions performed by computing system 1000 (e.g., evaluation, transformation, mathematical computation, or compilation of graphics programs, etc.). Processor 1005 may, for instance, drive display 1070 and receive user input from user interface adapter 1035 or any other user interfaces embodied by a system. User interface adapter 1035, for example, can take a variety of forms, such as a button, a keypad, a touchpad, a mouse, a dial, a click wheel, a keyboard, a display screen, and/or a touch screen. In addition, processor 1005 may be based on reduced instruction-set computer (RISC) or complex instruction-set computer (CISC) architectures or any other suitable architecture and may include one or more processing cores. Graphics hardware 1020 may be special purpose computational hardware for processing graphics and/or assisting processor 1005 in performing computational tasks. In some implementations, graphics hardware 1020 may include CPU-integrated graphics and/or one or more discrete programmable GPUs. Computing system 1000 (implementing one or more implementations discussed herein) can allow for one or more users to control the same system (e.g., computing system 1000) or another system (e.g., another computer or entertainment system) through user activity, which may include audio instructions, natural activity, and/or pre-determined gestures such as hand gestures.

Various implementations within the disclosure may employ sensors, such as cameras. Cameras and like sensor systems may include auto-focus systems to accurately capture video or image data ultimately used in a variety of applications, such as photo applications, augmented reality applications, virtual reality applications, and gaming. Processing images and performing recognition on the images received through camera sensors (or otherwise) may be performed locally on the host device or in combination with network accessible resources (e.g., cloud servers accessed over the Internet).

Returning to FIG. 10, device sensors 1025 may capture contextual and/or environmental phenomena such as time; location information; the status of the device with respect to light, gravity, and the magnetic north; and even still and video images. In addition, network-accessible information such as weather information may also be used as part of the context. All captured contextual and environmental phenomena may be used to provide context to user activity or information about user activity. For example, in accessing a gesture or the expression or emotion of a user, the contextual information may be used as part of the analysis, and the analysis may be performed using the techniques discussed herein.

Output from the device sensors 1025 may be processed, at least in part, by processors 1005 and/or graphics hardware 1020, and/or a dedicated image processing unit incorporated within or without computing system 1000. Information so captured may be stored in memory 1010 and/or storage 1015 and/or any storage accessible on an attached network. Memory 1010 may include one or more different types of media used by processor 1005, graphics hardware 1020, and device sensors 1025 to perform device functions. Storage 1015 may store data such as media (e.g., audio, image, and video files); metadata for media; computer program instructions; graphics programming instructions and graphics resources; and other software, including database applications (e.g., a database storing avatar frames), preference information, device profile information, and any other suitable data. Memory 1010 and storage 1015 may be used to retain computer program instructions or code organized into one or more modules in either compiled form or written in any desired computer programming language. When executed by, for example, a microcontroller, GPU or processor 1005, such computer program code may implement one or more of the acts or functions described herein (e.g., interpreting and responding to user activity including commands and/or gestures).

As noted above, implementations within this disclosure include software. As such, a description of common computing software architecture is provided as expressed in a layer diagram in FIG. 11. Like the hardware examples, the software architecture discussed here is not intended to be exclusive in any way, but rather to be illustrative. This is especially true for layer-type diagrams, which software developers tend to express in somewhat differing ways. In this case, the description begins with layers starting with the base hardware layer 1195 illustrating hardware layer 1140, which may include memory, general purpose processors, graphics processors, microcontrollers, or other processing and/or computer hardware such as memory controllers and specialized hardware. Above the hardware layer is the operating system kernel layer 1190 showing an example as operating system kernel 1145, which is kernel software that may perform memory management, device management, and system calls. The operating system kernel layer 1190 is the typical location of hardware drivers, such as a graphics processor drivers. The notation employed here is generally intended to imply that software elements shown in a layer use resources from the layers below and provide services to layers above. However, in practice, all components of a particular software element may not behave entirely in that manner.

Returning to FIG. 11, operating system services layer 1185 is exemplified by operating system services 1150. Operating system services 1150 may provide core operating system functions in a protected environment. In addition, operating system services shown in operating system services layer 1185 may include frameworks for OpenGL/OpenCL 1151 CUDA® or the like, Metal® 1152, user space drivers 1153, and a Software Rasterizer 1154. (CUDA is a registered trademark of NVIDIA Corporation.) While most of these examples all relate to graphics processor processing or graphics and/or graphics libraries, other types of services are contemplated by varying implementations of the disclosure. These particular examples also represent graphics frameworks/libraries that may operate in the lower tier of frameworks, such that developers may use shading and primitives and/or obtain fairly tightly coupled control over the graphics hardware. In addition, the particular examples named in FIG. 11 may also pass their work product on to hardware or hardware drivers, such as the graphics processor driver, for display-related material or compute operations.

Referring again to FIG. 11, OpenGL®/OpenCL® 1151 represent examples of well-known libraries and application programming interfaces for graphics processor compute operations and graphics rendering including 2D and 3D graphics. (OPENGL is a registered trademark of Silicon Graphics International Corporation. OPENCL is a registered trademark of Apple Inc.). Metal 1152 also represents a published graphics library and framework, but it is generally considered lower level than OpenGL/OpenCL 1151, supporting fine-grained, low-level control of the organization, processing, and submission of graphics and computation commands, as well as the management of associated data and resources for those commands. User space drivers 1153 is software relating to the control of hardware that exists in the user space for reasons that are typically related to the particular device or function. In many implementations, user space drivers 1153 work cooperatively with kernel drivers and/or firmware to perform the overall function of a hardware driver. Software Rasterizer 1154 refers generally to software used to make graphics information such as pixels without specialized graphics hardware (e.g., using only the CPU). These libraries or frameworks shown within the operating system services layer 1185 are only exemplary and intended to show the general level of the layer and how it relates to other software in a sample arrangement (e.g., kernel operations usually below and higher-level Applications Services 1160 usually above). In addition, it may be useful to note that Metal 1152 represents a published framework/library of Apple Inc. that is known to developers in the art. Furthermore, OpenGL/OpenCL 1151 may represent frameworks/libraries present in current versions of software distributed by Apple Inc.

Above the operating system services layer 1185 there is an Application Services layer 1180, which includes Sprite Kit 1161, Scene Kit 1162, Core Animation 1163, Core Graphics 1164, and other Applications Services 1160. The operating system services layer 1185 represents higher-level frameworks that are commonly directly accessed by application programs. In some implementations of this disclosure the operating system services layer 1185 includes graphics-related frameworks that are high level in that they are agnostic to the underlying graphics libraries (such as those discussed with respect to operating system services layer 1185). In such implementations, these higher-level graphics frameworks are meant to provide developer access to graphics functionality in a more user/developer friendly way and allow developers to avoid work with shading and primitives. By way of example, Sprite Kit 1161 is a graphics rendering and animation infrastructure made available by Apple Inc. Sprite Kit 1161 may be used to animate textured images or "sprites." Scene Kit 1162 is a 3D-rendering framework from Apple Inc. that supports the import, manipulation, and rendering of 3D assets at a higher level than frameworks having similar capabilities, such as OpenGL. Core Animation 1163 is a graphics rendering and animation infrastructure made available from Apple Inc. Core Animation 1163 may be used to animate views and other visual elements of an application. Core Graphics 1164 is a two-dimensional drawing engine from Apple Inc., which provides 2D rendering for applications.

Figure 11:
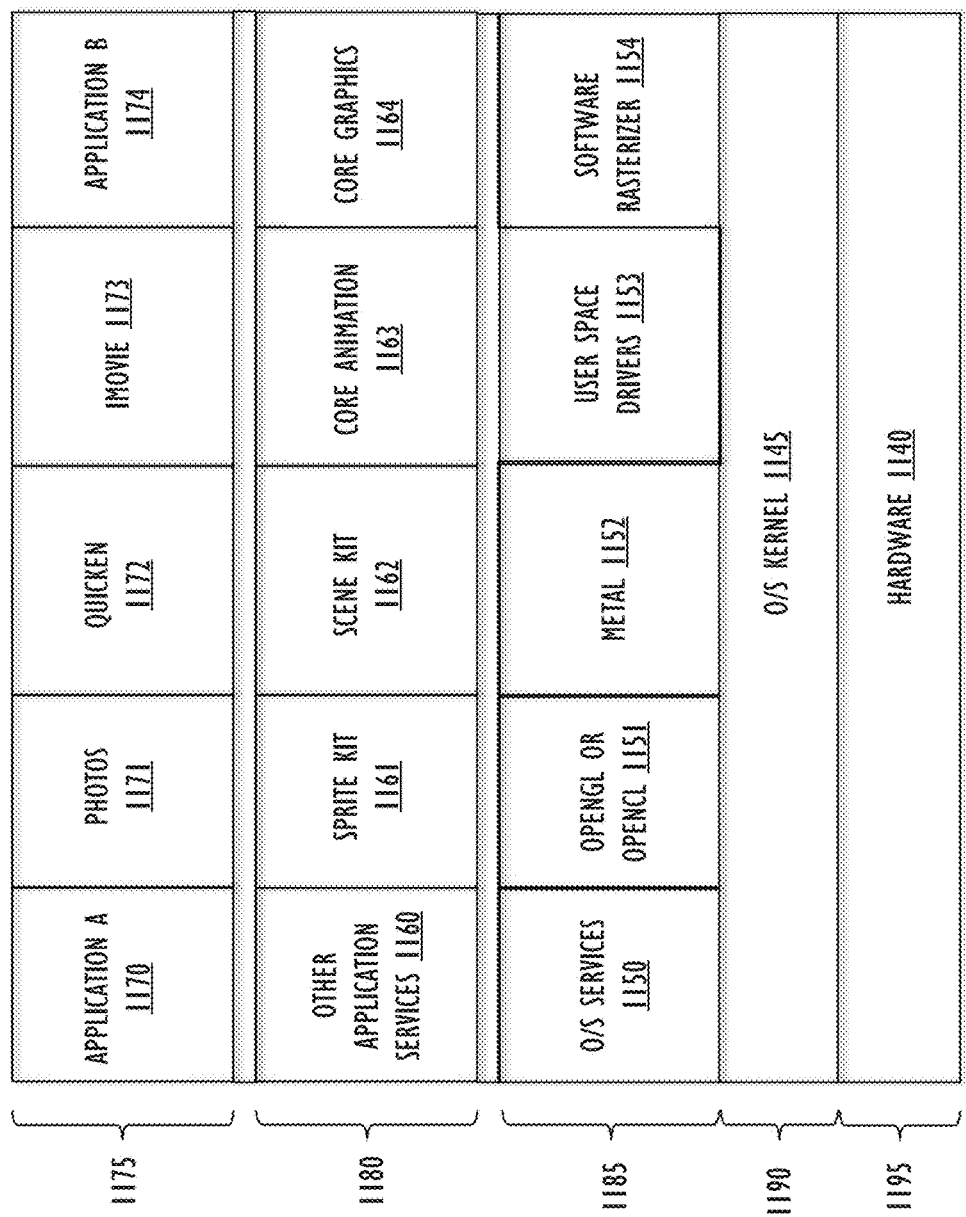
FIG. 11 is a block diagram of an implementation of a software layer and architecture where implementations of the present disclosure may operate.

Above the application services layer 1180, there is the application layer 1175, which may comprise any type of application program. By way of example, FIG. 11 shows three specific applications: photos 1171 (a photo management, editing, and sharing program), Quicken® 1172 (a financial management program), and iMovie® 1173 (a movie making and sharing program). (QUICKEN is a registered trademark of Intuit Inc. IMOVIE is a registered trademark of Apple Inc.). Application layer 1175 also shows two generic applications 1170 and 1174, which represent the presence of any other applications that may interact with or be part of the inventive implementations disclosed herein. Generally, some implementations of the disclosure employ and/or interact with applications that produce displayable and/or viewable content or produce computational operations that are suited for GPU processing.

In evaluating operating system services layer 1185 and applications services layer 1180, it may be useful to realize that different frameworks have higher- or lower-level application program interfaces, even if the frameworks are represented in the same layer of the FIG. 11 diagram. The illustration of FIG. 11 serves to provide a general guideline and to introduce exemplary frameworks that may be discussed later. Furthermore, some implementations of the disclosure may imply that frameworks in application services layer 1180 make use of the libraries represented in operating system services layer 1185. Thus, FIG. 11 provides intellectual reinforcement for these examples. Importantly, FIG. 11 is not intended to limit the types of frameworks or libraries that may be used in any particular way or in any particular implementation. Generally, many implementations of this disclosure relate to the ability of applications in layer 1175 or frameworks in layers 1180 or 1185 to divide long continuous graphics processor tasks into smaller pieces. In addition, many implementations of the disclosure relate to graphics processor (e.g., GPU) driver software in operating system kernel layer 1190 and/or embodied as microcontroller firmware in hardware layer 1195; such drivers performing a scheduling function for the graphics processor resource (e.g., GPU).

Figure 12:
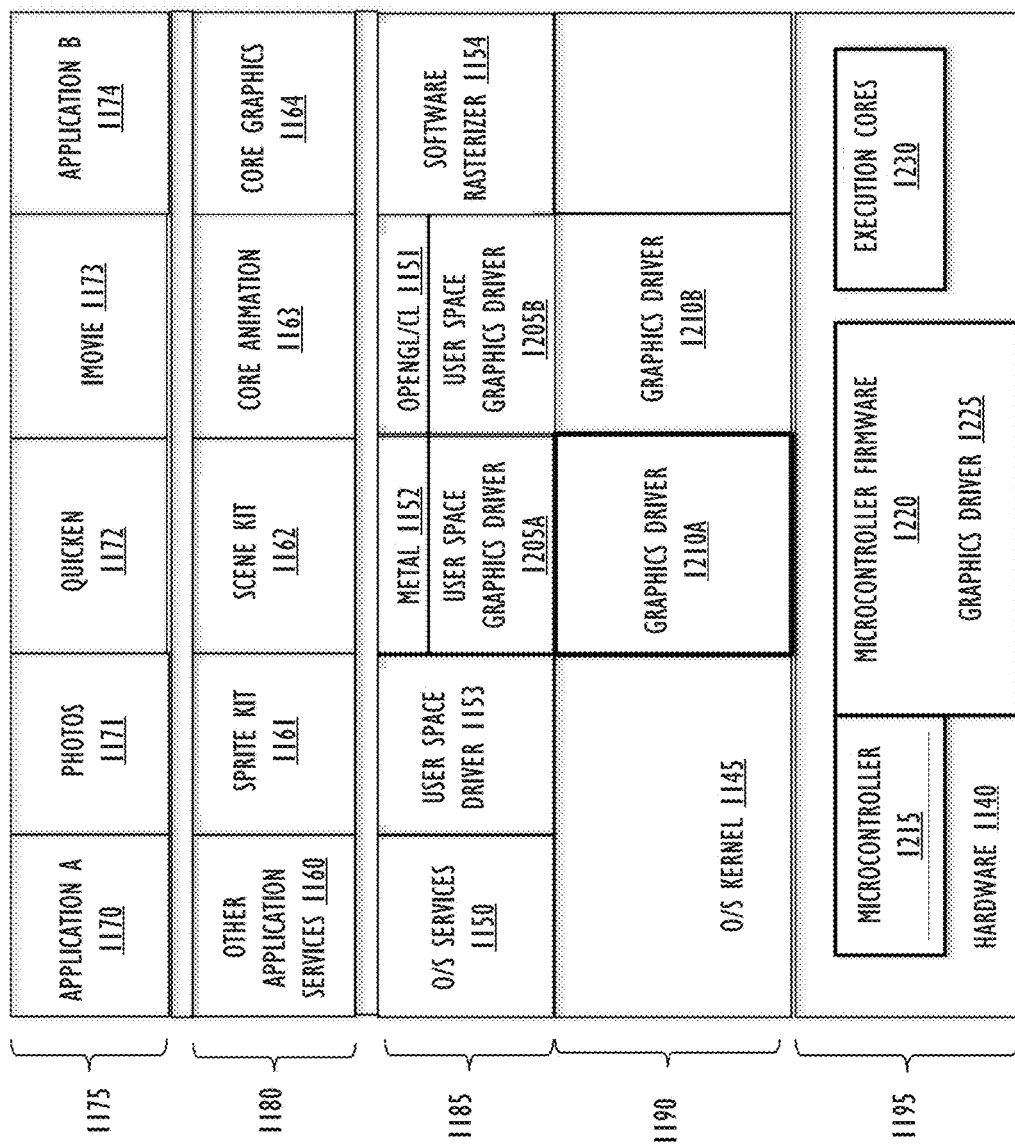
FIG. 12 is a block diagram of another implementation of a software layer and architecture where implementations of the present disclosure may operate.

FIG. 12 illustrates a software architecture similar to the standard architecture shown in FIG. 11. By way of distinction, the architecture of FIG. 12 shows: a user space graphics driver 1205A and 1205B; a kernel graphics driver 1210A and 1210B in the operating system kernel 1145; a microcontroller 1215, accompanied by microcontroller firmware 1220, including graphics driver firmware 1225 in the hardware layer 1140; and an execution cores 1230 in the hardware layer 1140. The presence of multiple instances of a graphics driver (user space graphics driver 1205A and 1205B, kernel graphics driver 1210A and 1210B, and graphics driver firmware 1225 in the microcontroller firmware 1220) indicates the various options for implementing the graphics driver. As a matter of technical possibility any of the three shown drivers might independently operate as a sole graphics driver. In some implementations of the disclosure, the overall graphics driver is implemented in a combination of kernel graphics driver 1210A and 120B and graphics driver firmware 1225 (e.g., in the operating system kernel and the microcontroller firmware, respectively). In other implementations, the overall graphics driver may be implemented by the combined effort of all three shown drivers 1205A and 1205B, 1210A and 1210B, and 1225.

At least one implementation is disclosed and variations, combinations, and/or modifications of the implementation(s) and/or features of the implementation(s) made by a person having ordinary skill in the art are within the scope of the disclosure. Alternative implementations that result from combining, integrating, and/or omitting features of the implementation(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Many other implementations will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A non-transitory program storage device, readable by at least one processor and comprising instructions stored thereon to cause the at least one processor to:
   create an indirect command buffer configured to be encoded into by a graphics processor;
   encode, within a command buffer, a first command that references the indirect command buffer, wherein the first command is to be executed by the graphics processor and causes the graphics processor to generate and write a set of commands into the indirect command buffer;
   encode, within the command buffer, a second command that is to be executed by the graphics processor, wherein execution of the second command causes execution of the set of commands encoded within the indirect command buffer; and
   commit the command buffer that includes the first command and the second command for execution on the graphics processor, wherein the at least one processor does not further encode commands into the command buffer after committing the command buffer for execution.

2. The non-transitory program storage device of claim 1, wherein the at least one processor includes a general-purpose processor.

3. The non-transitory program storage device of claim 1, wherein the indirect command buffer is configured to allow encoding of commands of the set of commands that have different primitive types.

4. The non-transitory program storage device of claim 1, wherein the indirect command buffer is configured to allow encoding of commands of the set of commands that have different draw types.

5. The non-transitory program storage device of claim 1, wherein the instructions further cause the at least one processor to:
   encode, within a second command buffer, a third command that triggers a re-execution of the set of commands encoded within the indirect command buffer by the graphics processor; and
   commit the second command buffer that includes the third command for execution on the graphics processor, wherein the at least one processor does not encode commands into the second command buffer after committing the second command buffer for execution.

6. The non-transitory program storage device of claim 1, wherein the instructions further cause the at least one processor to:
   encode, within the command buffer, a reset command that triggers the graphics processor to delete the set of commands within the indirect command buffer;
   encode, within the command buffer, a third command that references the indirect command buffer, wherein the third command triggers execution on the graphics processor a third operation that encodes a second set of commands within the indirect command buffer; and
   encode, within the command buffer, a fourth command that triggers execution on the graphics processor a fourth operation that executes the second set of commands within the indirect command buffer.

7. The non-transitory program storage device of claim 1, wherein the instructions further cause the at least one processor to:
   encode, within the command buffer, an optimization command to trigger the graphics processor to perform an optimization operation that removes state settings redundant across multiple commands for the set of commands.

8. The non-transitory program storage device of claim 1, wherein the instructions further cause the processor to:
   encode, within the command buffer, an optimization command to trigger the graphics processor to perform a memory compaction operation that moves the set of commands to a front portion of the indirect command buffer and un-encoded patches to a back portion of the indirect command buffer.

9. The non-transitory program storage device of claim 1, wherein the instructions further cause the processor to:
   encode, within the command buffer, a copy command to trigger the graphics processor to perform a copy operation that copies commands within the indirect command buffer to a destination indirect command buffer.

10. A system comprising:
    memory; and
    at least one processor operable to interact with the memory, and configured to:
    create an indirect command buffer configured to be encoded into by a graphics processor at a later point in time;
    encode, within a command buffer, a produce command that references the indirect command buffer, wherein the produce command causes execution on the graphics processor a first operation that produces and appends a set of commands to the indirect command buffer;
    encode, within the command buffer, a consume command that causes execution on the graphics processor a second operation that executes the set of commands encoded within the indirect command buffer; and
    commit the command buffer that includes the produce command and the consume command for execution on the graphics processor, wherein the indirect command buffer is not populated with any commands when the command buffer is committed for execution.

11. The system of claim 10, wherein the at least one processor is a general-purpose processor.

12. The system of claim 10, wherein the indirect command buffer is configured to allow encoding of commands of the set of commands that have different primitive types.

13. The system of claim 10, wherein the at least one processor is further configured to:
    encode, within a second command buffer, a second consume command that triggers a re-execution of the set of commands encoded within the indirect command buffer; and commit the second command buffer that includes the second consume command for execution on the graphics processor, wherein the at least one processor is unable to encode the second command buffer after committing the second command buffer for execution.

14. The system of claim 10, wherein the at least one processor is further configured to:
 encode, within the command buffer, a reset command that triggers the graphics processor to delete the set of commands within the indirect command buffer;
 encode, within the command buffer, a second produce command that references the indirect command buffer, wherein the second produce command triggers execution on the graphics processor a third operation that encodes a second set of commands within the indirect command buffer; and
 encoding, within the command buffer, a second consume command that triggers execution on the graphics processor a fourth operation that executes the second set of commands within the indirect command buffer.

15. The system of claim 10, wherein the at least one processor is further configured to:
 encode, within the command buffer, an optimization command to trigger the graphics processor to perform an optimization operation that removes state settings redundant across multiple commands for the set of commands.

16. The system of claim 10, wherein the at least one processor is further configured to:
 encode, within the command buffer, an optimization command to trigger the graphics processor to perform a memory compaction operation that moves the set of commands to a front portion of the indirect command buffer and un-encoded patches to a back portion of the indirect command buffer.

17. The system of claim 10, wherein the at least one processor is further configured to:
 encode, within the command buffer, a copy command to trigger the graphics processor to perform a copy operation that copies commands within the indirect command buffer to a destination indirect command buffer.

18. A non-transitory program storage device, readable by a graphics processor and comprising instructions stored thereon to cause the graphics processor to:
 obtain a command buffer that includes a produce command and a consume command that references a data structure, wherein the data structure is not populated with any commands when the graphics processor obtains the command buffer;
 execute the produce command that references the data structure to perform a first operation to generate and append a set of commands within the data structure; and
 execute, after encoding the set of commands, a consume command to perform a second operation to execute the set of commands encoded within the data structure.

19. The non-transitory program storage device of claim 18, wherein the graphics processor is a graphics processing unit (GPU).

20. The non-transitory program storage device of claim 18, wherein the instructions further cause the graphics processor to:
 obtain second consume command after performing the second operation; and execute the second consume command to perform a third operation that re-executes the set of commands encoded within the data structure.

* * * * *